UNITED STATES PATENT OFFICE.

RICHARD GLEY, OF BERLIN, GERMANY, ASSIGNOR TO ACTIEN-GESELLSCHAFT FÜR ANILIN FABRIKATION, OF BERLIN, GERMANY.

GREEN SULFUR DYE AND PROCESS OF MAKING SAME.

SPECIFICATION forming part of Letters Patent No. 741,030, dated October 13, 1903.

Application filed July 23, 1903. Serial No. 166,759. (No specimens.)

*To all whom it may concern:*

Be it known that I, RICHARD GLEY, of Berlin, in the Kingdom of Prussia, German Empire, have invented new and useful Improvements in the Production of Green Sulfur Dyes; and I do hereby declare that the following is a full, clear, and exact description of the invention, which will enable others skilled in the art to which it appertains to make and use the same.

I have discovered that the indophenol $$NH_2-C_{10}H_6-N=C_6H_4=O$$

which is obtained by joint oxidation of alpha-naphthylamin and para-amidophenol yields a most valuable sulfur dye when heated with alkali polysulfids in the presence of copper salts. The formation of the dyestuff takes place very readily and may practically be carried out by boiling in a concentrated aqueous solution.

The following example, in which the parts are by weight, will illustrate the manufacture of the new dyestuff. Ten parts of crystallized sodium sulfid are melted together with four parts of sulfur and the mass is allowed to cool to about 20° to 30°, then two parts of the indophenol, which is obtained by joint oxidation of alpho-naphthylamin and para-amidophenol, are added, preferably in form of a paste, and, finally, a concentrated aqueous solution of one part of copper sulfate is introduced. The mixture is kept boiling during twenty-four hours. After this time the mass is diluted with water, filtered, and the dyestuff is precipitated by the introduction of a current of air. The coloring-matter is filtered, pressed, and dried. It is a dark-green powder which is insoluble in water, easily soluble in alkali sulfids with green color, slightly soluble in caustic alkalies with greenish, in concentrated sulfuric acid with bluish color. The dyestuff produces on cotton green shades of remarkable fastness.

In the foregoing example the proportions of weight may be varied without essentially changing the result. Moreover, the indophenols aforementioned may be replaced by the corresponding indophenols derived from ortho-chlor-para-amidophenol or the homologues of para-amidophenol ortho-chlor-para-amidophenol. I further may employ the sulfonic acids of the aforementioned indophenols which are obtained by joint oxidation of para-amidophenol, ortho-chlor-para-amidophenol or their homologues with such alpha-naphthylamin sulfonic acids in which the para position to the amido group is not substituted.

Having now described my invention and the manner in which it may be carried out, what I claim is—

1. The process for the production of a green sulfur dye by heating the indophenol:

$$NH_2-C_{10}H_6-N=C_6H_4=O$$

with alkali polysulfids in the presence of copper.

2. The green sulfur dye, obtained as hereinbefore described which is a dark-green powder, insoluble in water, easily soluble in alkali sulfids with a green color, slightly soluble in concentrated sulfuric acid with bluish, in caustic alkalies with greenish color, dyeing unmordanted cotton green shades, substantially as described.

In witness whereof I have hereunto signed my name, this 9th day of July, 1903, in the presence of two subscribing witnesses.

RICHARD GLEY.

Witnesses:
WOLDEMAR HAUPT,
HENRY HASPER.